US012547977B2

(12) United States Patent
Cortese et al.

(10) Patent No.: US 12,547,977 B2
(45) Date of Patent: Feb. 10, 2026

(54) METHOD FOR TRACKING PRODUCT INVENTORY LOCATION IN A STORE

(71) Applicant: Simbe Robotics, Inc., South San Francisco, CA (US)

(72) Inventors: Dave Cortese, South San Francisco, CA (US); Brad Bogolea, South San Francisco, CA (US)

(73) Assignee: Simbe Robotics, Inc., Burlingame, CA (US)

( * ) Notice: Subject to any disclaimer, the term of this patent is extended or adjusted under 35 U.S.C. 154(b) by 464 days.

(21) Appl. No.: 18/085,465

(22) Filed: Dec. 20, 2022

(65) Prior Publication Data

US 2023/0401531 A1 Dec. 14, 2023

Related U.S. Application Data

(60) Provisional application No. 63/291,701, filed on Dec. 20, 2021.

(51) Int. Cl.
*G06Q 10/087* (2023.01)
*G06Q 10/067* (2023.01)
*G06V 20/40* (2022.01)

(52) U.S. Cl.
CPC ......... *G06Q 10/087* (2013.01); *G06Q 10/067* (2013.01); *G06V 20/44* (2022.01); *G06V 2201/07* (2022.01)

(58) Field of Classification Search
CPC .... G06Q 10/087; G06Q 10/067; G06V 20/44; G06V 2201/07; G06V 20/52
See application file for complete search history.

(56) References Cited

U.S. PATENT DOCUMENTS

| | | | | |
|---|---|---|---|---|
| 2019/0236531 | A1* | 8/2019 | Adato | H04N 23/80 |
| 2020/0074371 | A1* | 3/2020 | Bogolea | G05D 1/0282 |
| 2021/0398060 | A1* | 12/2021 | Chaubard | G06T 7/70 |
| 2021/0400195 | A1* | 12/2021 | Adato | G06Q 30/0201 |

* cited by examiner

*Primary Examiner* — Florian M Zeender
*Assistant Examiner* — Kimberly S. Bursum
(74) *Attorney, Agent, or Firm* — Run8 Patent Group, LLC; Peter Miller; Leah Raddatz

(57) ABSTRACT

A method includes: accessing a first image captured at a first time; deriving a first in-stock condition of the slot at the first time based on product units of a product type occupying a slot, depicted in the first image, at the first time based on features detected in the first image; accessing a second image captured at a second, later time; deriving a second out-of-stock condition of the slot at the second time based on features detected in the second image; accessing a back-of-store inventory status of the product type at the second time; and triggering an increase in quantity of facings of the product type at the slot based on a) the first in-stock condition at the slot at the first time, b) the first out-of-stock condition at the slot at the second time, and c) presence of back-of-store inventory of the product type at the second.

20 Claims, 5 Drawing Sheets

METHOD FOR TRACKING PRODUCT INVENTORY LOCATION IN A STORE

CROSS-REFERENCE TO RELATED APPLICATIONS

This application claims the benefit of U.S. Provisional Application No. 63/291,701, filed on 20 Dec. 2021, which is incorporated in its entirety by this reference.

This application is related to U.S. patent application Ser. No. 16/817,972, filed on 13 Mar. 2020, and Ser. No. 15/600,527, filed on 19 May 2017, each of which is incorporated in its entirety by this reference.

TECHNICAL FIELD

This invention relates generally to the field of stock tracking and more specifically to a new and useful method for tracking and autonomously managing product inventory within a store in the field of stock tracking.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
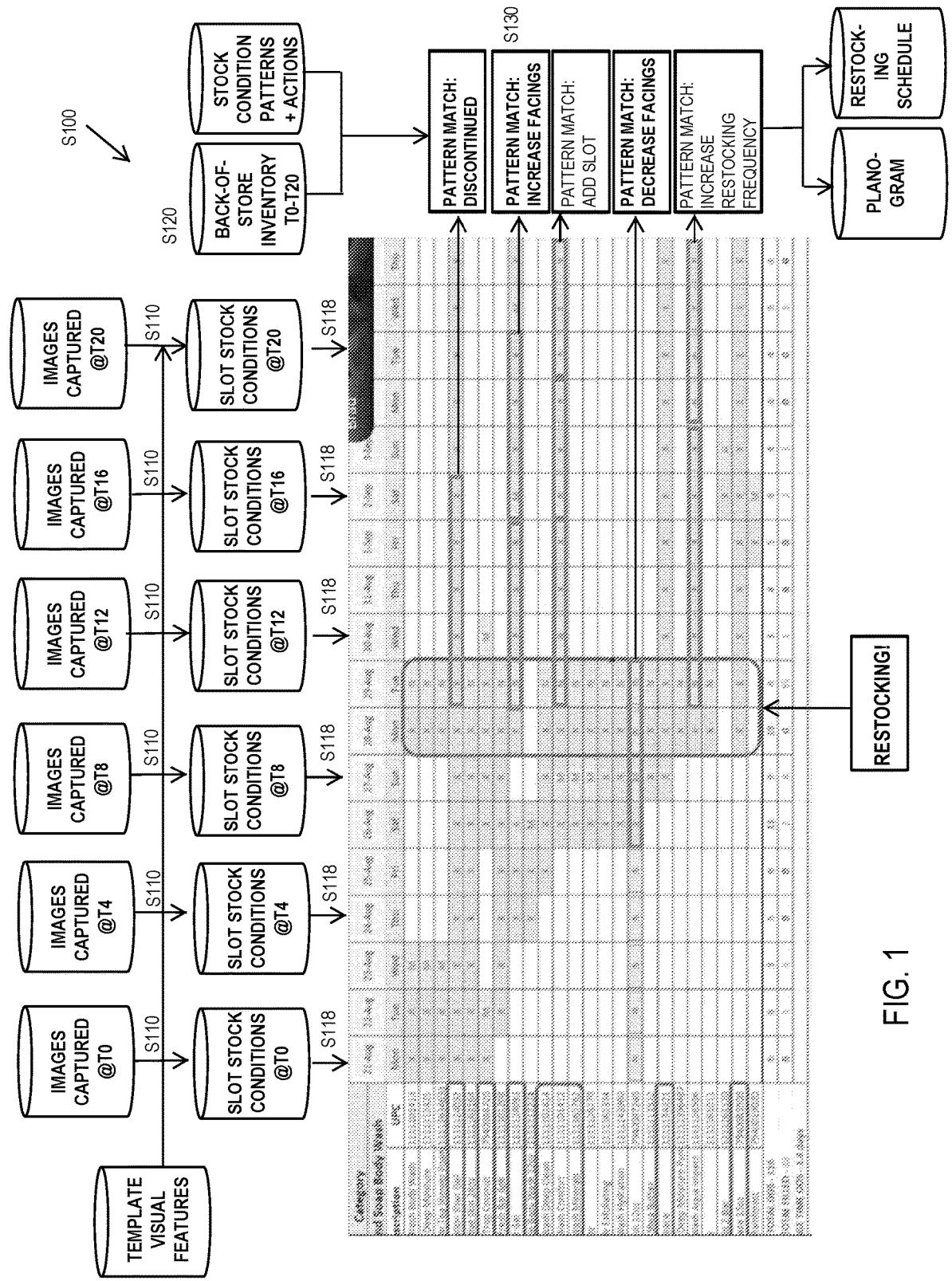
FIG. 1 is a flowchart representation of a first method.
Figure 2:
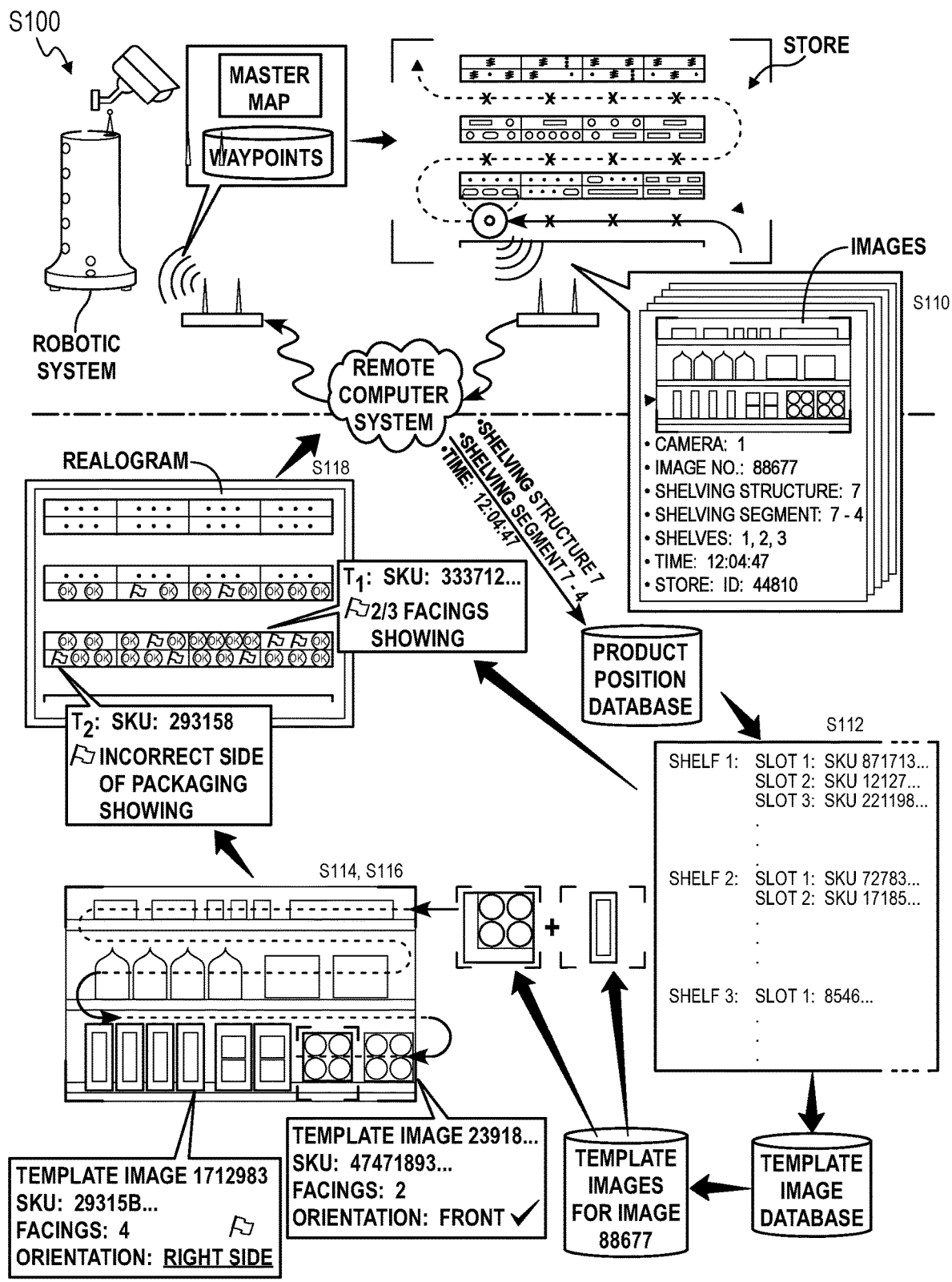
FIG. 2 is a flowchart representation of one variation of a first system.
Figure 5:
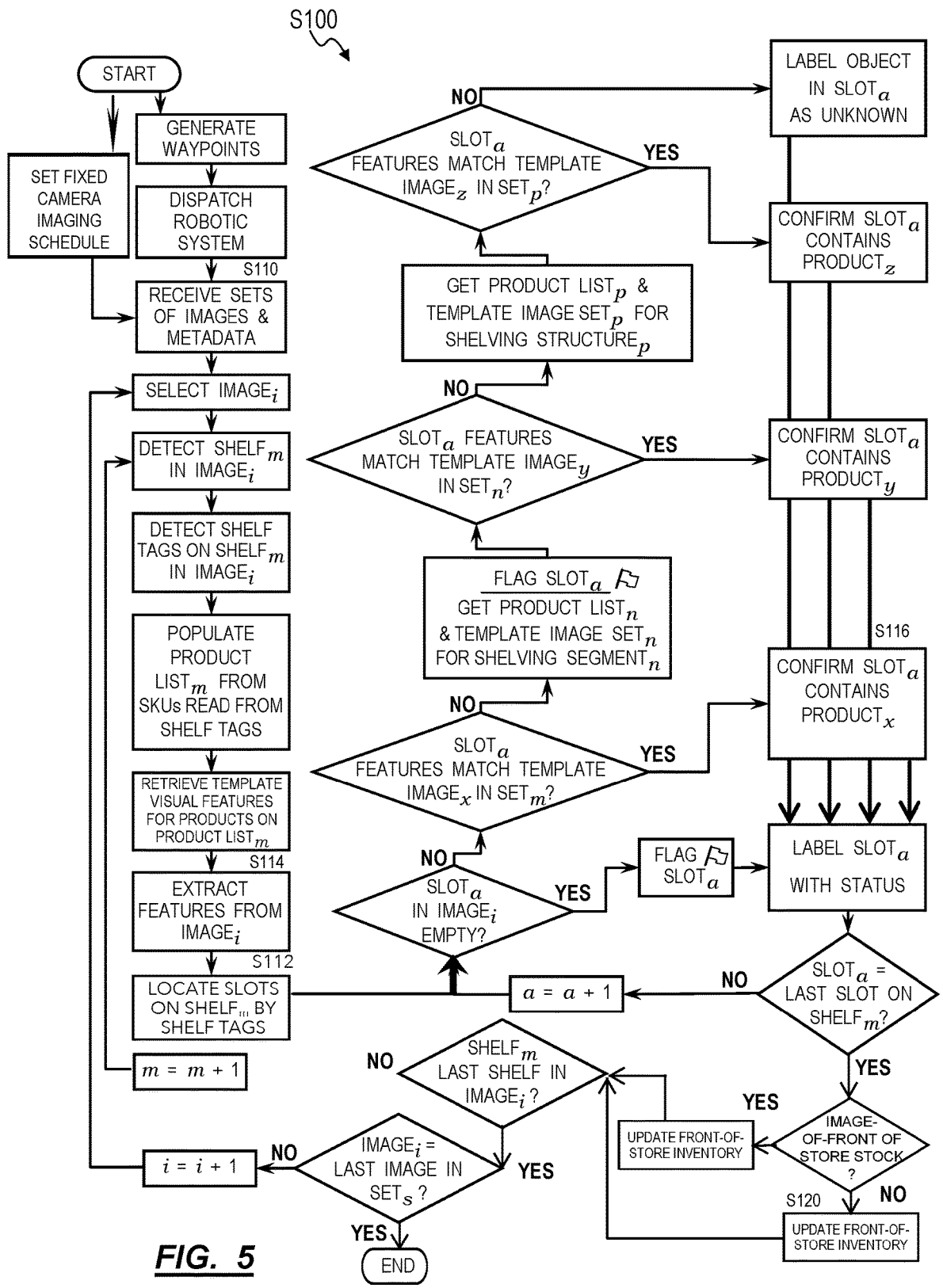
FIG. 5 is a flowchart representation of one variation of the method.

As shown in FIGS. 1, 2, and 5, a method S100 includes: accessing a first image, depicting a first inventory structure in a customer region of a store, captured at a first time in Block S110; detecting a first slot, in the first inventory structure, in a first region of the first image in Block S112; extracting a first set of features from the first region of the first image in Block S114; detecting a first set of product units of a first product type occupying the first slot at the first time based on the first set of features, the first product type assigned to the first slot in Block S116; deriving a first in-stock condition of the first slot at the first time based on the first set of product units in Block S118; accessing a second image, depicting the first inventory structure, captured at a second time succeeding the first time in Block S110; detecting the first slot in a second region of the second image in Block S112; extracting a second set of features from the second region of the second image in Block S114; deriving a first out-of-stock condition of the first slot at the second time based on the second set of features in Block S118; accessing a first back-of-store inventory status of the first product type in the store proximal the second time in Block S120; and triggering an increase in quantity of product facings of the first product type at the first slot in Block S130 in response to a) detecting the first in-stock condition at the first slot at the first time, b) detecting the first out-of-stock condition at the first slot at the second time, and c) presence of back-of-store inventory of the first product type proximal the second time according to the first back-of-store inventory status.

One variation of the method S100 shown in FIGS. 1, 2, and 5 includes: accessing a first image, depicting a first inventory structure in a customer region of a store, captured at a first time in Block S110; detecting a first slot, in the first inventory structure, in a first region of the first image in Block S112; extracting a first set of features from the first region of the first image in Block S114; detecting a first set of product units of a first product type occupying the first slot at the first time based on the first set of features, the first product type assigned to the first slot in Block S116; deriving a first in-stock condition of the first slot at the first time based on the first set of product units in Block S118; accessing a second image, depicting the first inventory structure, captured at a second time succeeding the first time in Block S110; detecting the first slot in a second region of the second image in Block S112; extracting a second set of features from the second region of the second image in Block S114; deriving a first out-of-stock condition of the first slot at the second time based on the second set of features in Block S118; accessing a third image, depicting the first inventory structure, captured at a third time succeeding the second time in Block S110; detecting the first slot in a third region of the third image in Block S112; extracting a third set of features from the third region of the third image in Block S114; deriving a second out-of-stock condition of the first slot at the third time based on the third set of features in Block S116; matching the first in-stock condition at the first slot at the first time, the first out-of-stock condition at the first slot at the second time, and the second out-of-stock condition at the first slot at the third time to a stored stock pattern associated with insufficient product facings in Block S132; and triggering increase in quantity of product facings of the first product type at the first slot based on the stored stock pattern in Block S130.

2. Applications

Generally, a computer system (e.g., a computer server, a computer network) can execute Blocks of the method S100: to track stock conditions in both customer-product facing (or "front of store") inventory structures and back-of-store inventory structures throughout a store over time; to detect patterns in in-stock, understock, and out-of-stock conditions at individual slots—in customer-product facing inventory structure—assigned to particular product types; to contextualize these patterns based on back-of-store inventory of these product types; and to automatically predict and/or implement changes to product type and product facing assignments at these slots to effect total product sale rate at the store over time.

More specifically, the computer system can: derive and track stock conditions at a particular individual customer-product facing slot in the store over time based on photographic images captured by fixed cameras and/or a mobile robotic system deployed in the store; similarly derive backof-store inventory of a product type assigned to the particular slot based on similar photographic images captured by fixed cameras and/or the mobile robotic system; match this sequence of slot and back-of-store stock conditions for the slot and the product type over time to a store product stock pattern; and selectively prompt or automatically implement changes for the slot and/or the product type, such as modifying order delivery specifications for the product type, modifying a product type assigned to the slot, modifying a restocking schedule for the slot, or modifying a quantity of product facings of the product type in the slot.

2.1 Example: Product Facing Expansion

For example shown in FIG. 1, if a first slot is properly restocked during each scheduled restocking period but is nonetheless frequently out-of-stock and if a first product type assigned to the first slot is available in back-of-store inventory while the first product type is out-of-stock at the slot, the computer system can: match this sequence of stock conditions and back-of-store inventory context to an predefined "insufficient product facing condition" for the first product type at the first slot; and thus generate a prompt—or automatically update a planogram and/or restocking schedule of the store—to increase the quantity product facings in the first slot.

Additionally or alternatively, in this example, if the scheduled restocking frequency of the first slot is less than a maximum restocking frequency set for the store (e.g., scheduled restocking twice per week with a maximum store maximum restocking frequency of once daily), the computer system can generate a prompt—or automatically update the restocking schedule of the store—to increase the restocking frequency of the first slot.

Additionally or alternatively, if the first product type is available at a limited number of (e.g., one) slot in the store, the computer system can generate a prompt—or automatically update the planogram of the store—to add an additional slot assigned to the first product type in the store, such as in a different aisle in the store as the first slot.

Conversely, if a first slot is properly restocked during each scheduled restocking period but is nonetheless frequently out-of-stock and if the first product type assigned to the first slot is also not available in back-of-store inventory when the first product type is out-of-stock at the slot, the computer system can generate a prompt—or automatically update a delivery order for the store—to increase a quantity of product units of the first product type delivered to the store (e.g., per week, per delivery). (In this example, the computer system can also prompt or implement an increase in the quantity of product facings of the product type in the first slot.)

The computer system can therefore prompt or automatically update the planogram, restocking schedule, and/or delivery order for the store to reduce out-of-stock conditions at the first slot and thus enable a greater sell-through rate of the first product type at the store.

2.2 Example: Product Facing Reduction

Furthermore, if a second slot remains out-of-stock and is not restocked for more than a threshold time duration (e.g., two weeks), a second product type assigned to the second slot is not available in back-of-store inventory, and back-of-store inventory for the second product type does not improve for the second product type over a sequence of deliveries to the store, the computer system can: match this pattern of events to a discontinued stock condition at the second slot; predict that the second product type is discontinued; and prompt reassignment of the second slot to a replacement product type. Alternatively, the computer system can remove discard the second slot, implement the foregoing methods to selectively increase product facings in other slots on the same inventory structure, and thus selectively expand these other slots into shelf space previously occupied by the second slot.

Similarly, if a third slot remains consistently partially or fully in-stock for more than a threshold time duration (e.g., two weeks) and/or an actual sale rate of the third product type (e.g., derived from point-of-sale data collected at the store) is less than a target or predicted sale rate of the third product type, the computer system can: match this pattern of events to an excess product facing condition at the third slot; reduce a quantity of product facings allocated to the third product type in the third slot; and implement the foregoing methods to selectively increase product facings in other slots on the same inventory structure and thus expand these other slots into shelf space previously occupied by the product facing(s) removed from the third slot.

The computer system can therefore prompt or automatically update the planogram, restocking schedule, and/or delivery order for the store in order to: reduce shelf area allocated to discontinued and lower-demand product types; and reallocate this shelf area to additional product facings in new or existing slots assigned to available and higher-demand product types.

Thus, the computer system can execute Blocks of the method S100 to autonomously manage product delivery to the store, slot restocking in the store, product type distribution, and/or product facings in slots throughout the store based on stock condition patterns at slots in the front of the store and back-of-store inventory of the product types in the back of the store.

3. Hierarchy and Terms

A "store" is referred to herein as a (static or mobile) facility containing one or more inventory structures.

A "product type" is referred to herein as a type of loose or packaged good associated with a particular product identifier (e.g., a SKU) and representing a particular class, type, and varietal. A "unit" or "product unit" is referred to herein as an instance of a product type—such as one bottle of detergent, one box of cereal, or package of bottled water—associated with one SKU value.

A "product facing" is referred to herein as a side of a product designated for a slot.

A "slot" is referred to herein as a section (or a "bin") of a shelf on an "inventory structure" designated for storing and displaying product units of the product type (i.e., of the same SKU or CPU) in a customer-product facing (or "front") of the store. An inventory structure can include a shelving segment, a shelving structure, or other product display containing one or more slots on one or more shelves.

A "planogram" is referred to herein as a plan or layout designating display and stocking of multiple product facings across multiple slots, such as: in a particular shelving segment; across a particular shelving structure; across multiple shelving structures within a particular aisle; across multiple aisles in the store; or throughout the entirety of the store. For example, the planogram can define a graphical representation of an inventory structure in the store, including graphical representations of each slot in this inventory structure, each populated with a quantity of graphical representations of product type assigned to this slot equal to a quantity of product facings assigned to this slot. Alternatively, the planogram can record textual product placement for one or more inventory structures in the store in the form of a spreadsheet, slot index, or other database.

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on photographic images and/or other data recorded by the fixed camera in the store.

4. Mobile Robotic System

Figure 4:
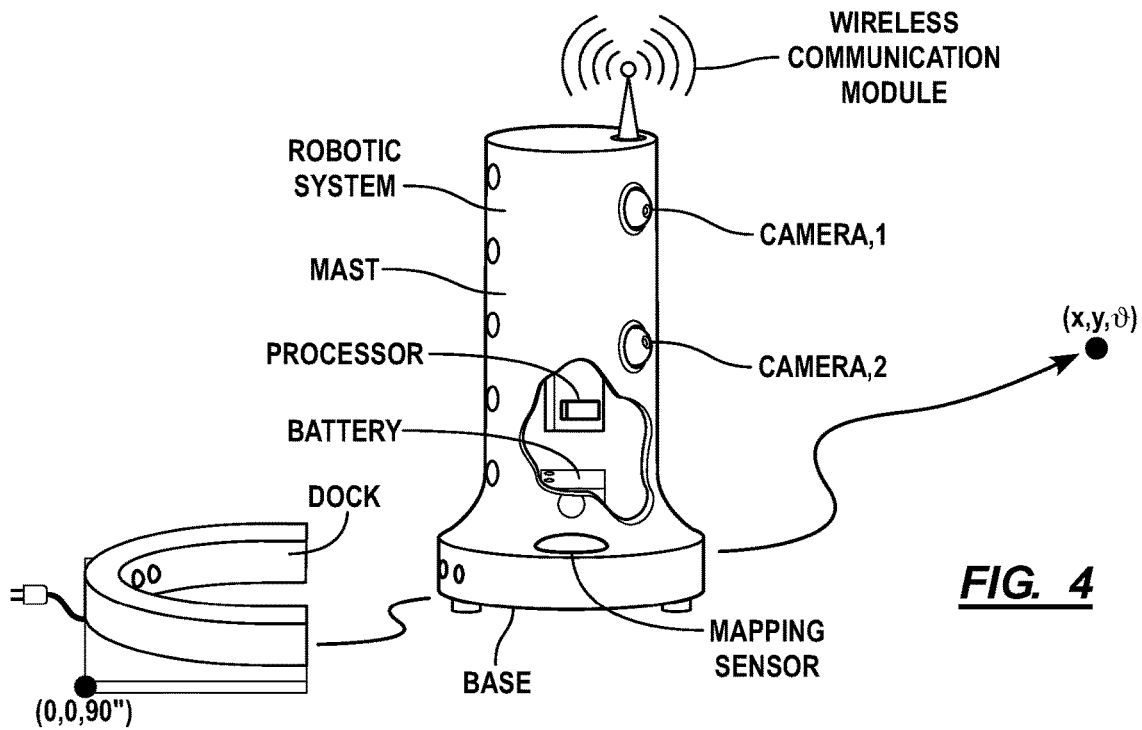
FIG. 4 is a schematic representation of the first system.

As shown in FIG. 4 mobile robotic system autonomously navigates throughout a store and records images—such as color (e.g., RGB) images of packaged goods and hyper-spectral images of fresh produce and other perishable goods—continuously or at discrete predefined waypoints throughout the store during a scan cycle. Generally, the mobile robotic system can define a network-enabled mobile robot that can autonomously: traverse a store; capture color and/or hyper-spectral images of inventory structure, shelves, produce displays, etc. within the store; and upload those images to the remote computer system for analysis, as described below.

In one implementation, the mobile robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems); a processor that transforms data collected by the mapping sensors into two- or three-dimensional maps of a space around the mobile robotic system; a mast extending vertically from the base; a set of color cameras arranged on the mast; one or more hyper-spectral sensors (or "cameras," "imagers") arranged on the mast and configured to record hyper-spectral images representing intensities of electromagnetic radiation within and outside of the visible spectrum; and a wireless communication module that downloads waypoints and a master map of a store from a computer system (e.g., a remote server) and that uploads photographic images recorded by the camera and maps generated by the processor to the remote computer system. In this implementation, the mobile robotic system can include cameras and hyper-spectral sensors mounted statically to the mast, such as two vertically offset cameras and hyper-spectral sensors on a left side of the mast and two vertically offset cameras and hyper-spectral sensors on the right side of mast. The mobile robotic system can additionally or alternatively include articulable cameras and hyper-spectral sensors, such as: one camera and hyper-spectral sensor on the left side of the mast and supported by a first vertical scanning actuator; and one camera and hyper-spectral sensor on the right side of the mast and supported by a second vertical scanning actuator. The mobile robotic system can also include a zoom lens, a wide-angle lens, or any other type of lens on each camera and/or hyper-spectral sensor.

Furthermore, multiple mobile robotic systems can be deployed in a single store and can be configured to cooperate to image shelves within the store. For example, two mobile robotic systems can be placed in a large single-floor retail store and can cooperate to collect images of all shelves and produce displays in the store within a threshold period of time (e.g., within one hour). In another example, one mobile robotic system can be placed on each floor of a multi-floor store, and each mobile robotic system can collect images of shelves and produce displays on its corresponding floor. The remote computer system can then aggregate color and/or hyper-spectral images recorded by multiple mobile robotic systems placed in one store to generate a graph, map, table, and/or task list for managing distribution and maintenance of product throughout the store.

5. Fixed Camera

As shown in FIG. 2, a fixed camera can include: an optical sensor defining a field of view; a motion sensor configured to detect motion in or near the field of view of the optical sensor; a processor configured to extract data from images recorded by the optical sensor; a wireless communication module configured to wirelessly transmit data extracted from images; a battery configured to power the optical sensor, the processor, and the wireless communication module over an extended duration of time (e.g., one year, five years); and a housing configured to contain the optical sensor, the motion sensor, the processor, the wireless communication module, and the battery and configured to mount to a surface within the field of view of the optical sensor intersecting an area of interest within the store (e.g., a shelf below, a shelving segment on an opposite side of an aisle).

The optical sensor can include: a color camera configured to record and output 2D photographic images; and/or a depth camera configured to record and output 2D depth images or 3D point clouds. However, the optical sensor can define any other type of optical sensor and can output visual or optical data in any other format.

The motion sensor can include a passive infrared sensor that defines a field of view that overlaps the field of view of the optical sensor and that passively outputs a signal representing motion within (or near) the field of view of optical sensor. The fixed camera can transition from an inactive state to an active state on a regular interval (e.g., once per hour), on a regular schedule (e.g., proportional to historical patron occupancy in the store), when triggered by the mobile robotic system, and/or responsive to an output from the motion sensor indicating motion in the field of view of the motion sensor. Once in the active state, the fixed camera can trigger the optical sensor to record an image (e.g., a 2D color photographic image), and the wireless communication module can then broadcast this image to a wireless router in the store. Alternatively, the fixed camera can store this image in a local memory (e.g., a buffer), and the wireless communication module can wirelessly transmit images from the buffer to the mobile robotic system when requested by the mobile robotic system during a next scan cycle (e.g., when the mobile robotic system navigates to a location near the fixed camera during this next scan cycle).

The optical sensor, motion sensor, battery, processor, and wireless communication module, etc. can be arranged within a single housing configured to install on an inventory structure—such as by adhering or mechanically fastening to a shelf face or surface within a shelving segment or mounting to an inventory structure via a stalk, as shown in FIG. 1—with the field of view of the optical sensor product facing a shelf below, an adjacent slot, or a shelving segment on an opposing side of an aisle in the store, etc. However, this fixed camera can define any other form and can mount to a surface or inventory structure in any other way.

6. Stockkeeping Via Mobile Robotic System

Generally, as shown in FIGS. 2 and 5, the computer system dispatches the mobile robotic system: to autonomously navigate throughout areas of a store, such as both a customer region (or "front") of the store and a back-of-store inventory region (or "back") of the store; and to image inventory structures in the front and back of the store.

For example, inventory structures in the front of the store can include: store shelves; aisle end caps; produce bins; and other structures from which a patron can select a product type. Inventory structures located in the front of the store can also include "top-shelf" inventory locations, such as non-customer-product facing shelves located overhead customer-product facing slots and configured to store excess and loose product units not returned to the back of the store after restocking of the customer-product facing slots below. Inventory structures in the back of the store can include structures or areas designated to hold product delivered to the store—such as stored in boxed formats—before these product units are transferred to the front of the store during later restocking periods. For example, back-of-store inventory structures can include shelving, bins, floor spaces, and receiving areas.

In one variation, during a scan cycle, the mobile robotic system can: autonomously navigate to an inventory structure in the front of the store; record an image of the customer-product facing inventory structure; upload the image to a database; and repeat this process to image each other customer-product facing inventory structure in the front of the store during the scan cycle. The computer system can then retrieve a first image captured by the remote computer system during this scan cycle and implement computer vision techniques described below and in U.S. patent application No. ?M01?: to detect regions of the image depicting individual slots (e.g., based on positions of shelf tags detected in the image, based on positions of product units detected in the image, or based on slot location defined in a planogram); to retrieve template visual features of known product types assigned to these slots (e.g., according to shelf tags or the planogram); to extract features from these regions of the image; to detect and identify product units in these slots based on congruence of features extracted from corresponding regions of the image and template visual features representing these known product types; and to compile locations and product types of these product units into stock conditions of each slot detected in the image. More specifically, the computer system can identify each slot as fully-stocked, understocked, out-of-stock (or derive a stock rate between 0% and 100% for the sale) based on quantities of product units—detected in the corresponding region of the image—that match template visual features of a particular product type assigned to the slot by a corresponding shelf tag detected in the image and/or by the planogram. The computer system can then repeat this process for each other image captured during the scan cycle and aggregate stock conditions of slots—depicted in these images—into a realogram representing stock distribution in customer-product facing inventory structures throughout the store during the scan cycle.

Additionally or alternatively, the computer system can derive top-stock inventory conditions on inventory structures in the front of the store based on features detected in these images captured by the mobile robotic system during the scan cycle. In particular, the computer system can: implement computer vision techniques described herein and in U.S. patent application No. ?M11? to detect locations and product types of product units in top stock locations through the front of the store; aggregate these top stock data into a top stock inventory of the store during the scan cycle; and/or write these top stock data to the realogram representing front-of-store stock and inventory in the store during the scan cycle.

Additionally or alternatively, during the same or other scan cycle, the mobile robotic system can: autonomously navigate to an inventory structure in the back of the store; record an inventory image of the back-of-store inventory structure; upload the image to a database; and repeat this process to image each other back-of-store inventory structure in the back of the store during the scan cycle. The computer system can then retrieve a first inventory image captured during this scan cycle and implement computer vision techniques described in U.S. patent application No. ?M01? to detect locations and product types of loose and bulk product units in the back of the store; aggregate these product data into a back-of-store inventory of the store during the scan cycle; and/or write these back-of-store inventory data to the realogram representing front-of-store stock and back-of-store inventory in the store during the scan cycle.

Therefore, the computer system can derive front-of-store stock and back-of-store inventory in the store from images captured by the mobile robotic system while traversing the store during a scan cycle.

7. Stockkeeping Via Fixed Camera

Additionally or alternatively, the computer system can: access images captured by fixed cameras product facing customer-product facing inventory structure and/or back-of-store inventory structures; and implement similar methods and techniques to detect and track front-of-store stock and back-of-store inventory in the store based on these images.

For example, the computer system can: access a first photographic image captured by a first fixed camera—arranged within the store and product facing a customer-product facing inventory structure—at a first time; and implement the foregoing methods and techniques to derive stock conditions in slots in this customer-product facing inventory structure at the first time based on features detected in the first image. In this example, the computer system can also: access a second image including a second photographic image captured by a second fixed camera—arranged within the store and product facing a back-of-store inventory structure—proximal (e.g., within thirty minutes of) the first time; and implement the foregoing methods and techniques to derive inventory conditions in this back-of-store inventory structure proximal the first time based on features detected in the second image.

8. Image Access

One variation of the method S100 shown in FIG. 4 includes: deploying a robotic system—including an optical sensor—to autonomously navigate throughout the store during a scan cycle in Block S102; and accessing an image captured by the robotic system while traversing an aisle product facing the inventory structure in Block S110. In particular, in this variation, the computer system can implement methods and techniques described in U.S. patent application Ser. No. 15/600,527 to deploy a mobile robotic system to autonomously navigate throughout the store during a scan cycle, to capture images of inventory structures throughout the store during the scan cycle, and to offload these images to the computer system. The computer system can then access and process these images as described below.

The computer system can also implement methods and techniques described above to: access a sequence of photographic images captured by the robotic system during the scan cycle while traversing an aisle product facing the inventory structure; and compile this sequence of photographic images into the first image defining a composite photographic image depicting a set of shelving segments spanning the first inventory structure.

For example, the computer system can: deploy the mobile robotic system to autonomously navigate throughout the customer region of the store and the back-of-store inventory region of the store during a scan cycle; access a first sequence of photographic images captured by the robotic system during the scan cycle while traversing the aisle; and compile the first sequence of photographic images into a first image. The computer system can further access a second image, depicting a back-of-store inventory structure, captured by the mobile robotic system during the scan cycle; extract a set of features from the second image; and derive back-of-store inventory statuses of product types in the store—during the scan cycle—based on this set of features.

9. Front-of-Store Stock Conditions

In particular, upon receipt of an image from a fixed camera or the mobile robotic system, the computer system implements computer vision techniques to detect slots, detect product units, identify product types of these product units, detect shelf tags, and/or characterize stock conditions in these slots.

In one implementation in which the computer system accesses an image captured by a fixed camera, because the fixed camera is fixed, the computer system can match the location of the fixed camera to the planogram of the store and map a slot depicted in an image captured by the fixed camera to a slot in the planogram. The computer system can: access an image captured by a fixed camera in the store; access a location of the fixed camera; add a location tag to the image captured by the fixed camera; access a planogram of the store containing the location data of a set of slots and the product type assigned to each slot; search the planogram of the store and match the location tag of the image to slot locations in the planogram to define a set of slots depicted in the image; access a database of optical features representing product types assigned to these slots; match optical features depicted in the image to optical features associated with unique product types in the database to identify a product type located in each slot depicted in the image; and generate a realogram representing locations and stock conditions of each slot on the inventory structure depicting in the image.

In another implementation, the computer system: accesses an image captured by the fixed camera in the store; retrieves a predefined map of slot locations in the field of view of the camera; segments the image according to the predefined map; and implements the foregoing methods and techniques to identify product unis in each slot based on features extracted from each image segment. In yet another implementation, the computer system accesses an image captured by the fixed camera in the store; detects shelf tags on shelves depicted in the image; segments the image by individual shelf slots based on positions of shelf tags depicted in the image; and implements the foregoing methods and techniques to identify product units in each slot based on features extracted from each image segment.

However, the computer system can implement any other method or technique to transform images captured by the camera into stock conditions of slots in the field of view of the camera over time.

9.1 Slot Definition+Slot Condition: Shelf Tags

Figure 3:
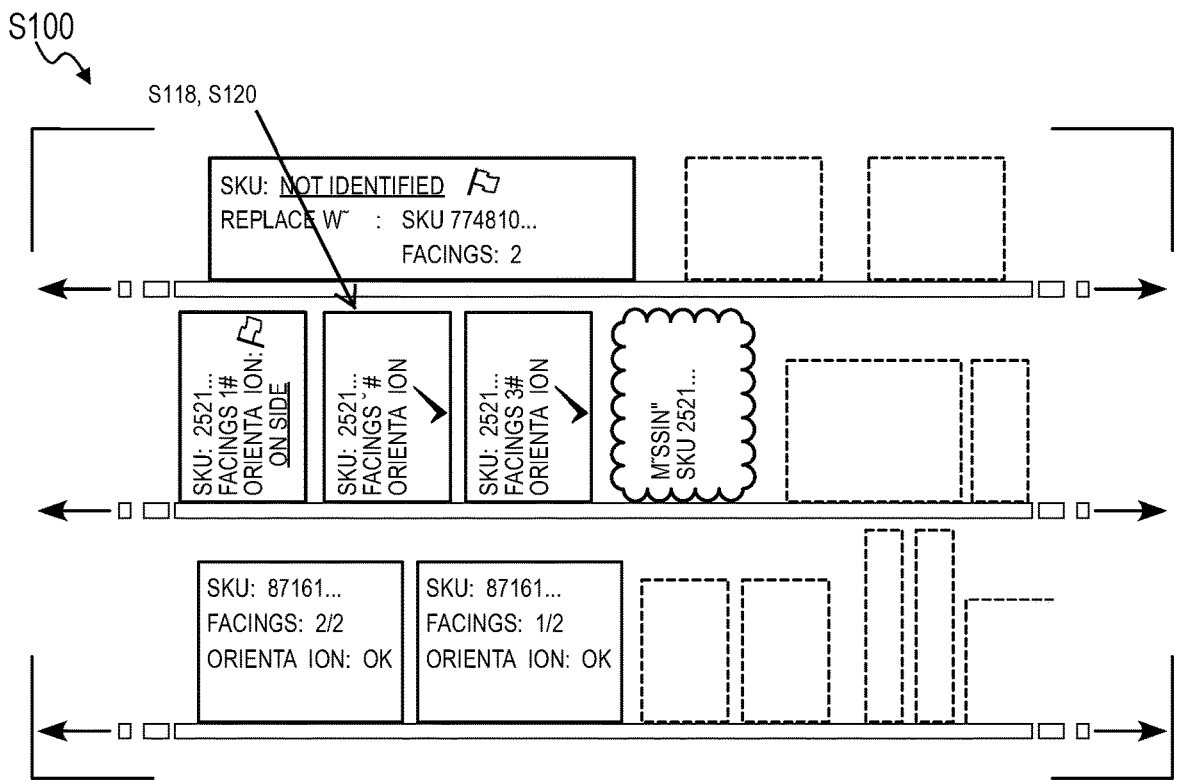
FIG. 3 is a graphical representation of one variation of a first system.

In one implementation shown in FIGS. 2, 3, and 5, the computer system: isolates regions of the image depicting individual slots on the inventory structure; detects and extracts features from these regions of the image depicting individual slots; and identifies product types of product units occupying these slots based on these features. The computer system can further: characterize organization of individual slots based on orientation of product units and proximity of product units to centers and/or boundaries of corresponding slots; and derive a stock conditions of each slot depicting in the image based on quantities of product types and organization of product units occupying these slots.

In this implementation, the computer system can: detect shelf tags in the image; and define slot boundaries of slots depicted in the image based on positions of these shelf tags. In particular, in this implementation, the computer system can: detect shelf faces in the image; and detect a set of shelf tags on these shelf faces, such as by implementing object re-recognition or template matching techniques, by implementing optical character recognition to detect pricing information on shelf tags, or by detecting optical barcodes on these shelf tags. The computer system can then calculate a rectangular slot boundary of a first slot depicting the image based on locations of shelf tags and shelf faces detected in the image, such as by: locating a bottom edge of a first slot boundary along the top edge of a first shelf face on which the first shelf tag is applied; locating a top edge of the first slot boundary along the bottom edge of a next second shelf face above the first shelf tag; locating a left edge of the first slot boundary in-line with a left edge of the first shelf tag; and locating a right edge of the first slot boundary in-line with a left edge of a second shelf tag to the right of the first shelf tag. The computer system can also: annotate the image with the first slot boundary of the first slot, such as by projecting the first slot boundary onto the image; extract an identifier (e.g., a SKU value, a barcode) of a first product type specified by the first shelf tag and thus assigned to the first slot; and annotate the first slot boundary with the identifier of the first product type. Alternatively, the computer system can: identify a first slot address of the first slot, such as based on a position of the first slot in the inventory structures or based on slot address extracted (e.g., read) from the first shelf tag; query a planogram of the store for the identifier of the first product type assigned to the first slot based on the first slot address; and annotate the first slot boundary with the identifier of the first product type. The computer system can repeat this process for each other shelf tag detected in the image.

In this implementation, the computer system can then: detect a first product unit, of a first product type assigned to the first slot, in a first region of the image depicting the first slot and contained within a first slot boundary of the first slot; and derive a first organization metric of the first slot based on a position of the first product unit relative to the first slot boundary. For example, the computer system can: retrieve a first set of template features (e.g., product packaging text, product packaging geometry, product packaging colors or color histogram, product packaging template images) representing the first product type assigned to the first slot; detect a first object in the first region of the image bounded by the first slot boundary; extract a first set of image features from a first subregion of the image representing the first object; calculate a first similarity score between the first set of template features and the first set of image features; and identify the object as a first product unit of the first product type if the first similarity score exceeds a threshold score. The computer system can implement similar methods and techniques to detect product units of other product types—not assigned to the first slot—present in the first slot.

The computer system can repeat this process for each other object detected in the first slot to generate a count of product units of the first product type (and other product types) occupying the first slot. The computer system can also characterize organization of the first slot based on arrangement and orientation of product units detected in the first slot. The computer system can store this count of product units and their organization in the first slot as a first stock condition of the first slot.

In a similar implementation, the computer system: accesses a first image—of a first inventory structure and captured at a first time—in Block S110; detects a first shelf tag in the first image; locates a first slot boundary on the first image relative to the first shelf tag in Block S112; reads a first product identifier of a first product type from the first shelf tag depicted in the first image; and retrieves a set of template visual features, associated with the first product identifier, from a template product feature database. The computer system then: detects a first object in a first region of first image bounded by the first slot boundary; extracts a first set of features, representing the first object, from the first region of the first image in Block S114; identifies the first object as a first product unit of the first product type in Block S116 based on congruence of the first set of features and the first set of template visual features; and derives a first in-stock condition of the first slot based on a count of product units in the first set of product units in Block S118. Conversely, the computer system can derive a first out-of-stock condition of the first slot based on absence of congruence between the first set of features and the first set of template visual features. The computer system can then repeat this process to derive a stock condition of each other slot depicted in the first image and in other images captured by the mobile robotic system during a scan cycle and/or by fixed cameras deployed in the store.

9.2 Slot Definition+Slot Condition: Known Sensor Field of View

In another implementation, the computer system projects a stored slot boundary onto the image to define slot boundaries of slots depicted in the image. For example, for an image capture by a fixed camera product facing a static inventory structure, the computer system can: retrieve a stored slot boundary template defining slot boundaries of slots in the field of view of the fixed camera; and project the stored slot boundary template onto the image to define slot boundaries of these slots on the image. The computer system can then execute the foregoing methods and techniques to derive a stock condition of each slot depicted in the image.

In a similar implementation, the computer system can: access a photographic image captured by a fixed camera at a first time; retrieve a geometry of a field of view of the fixed camera based on a known location of the fixed camera within the store; project the geometry of the field of view onto a planogram of the store; and thus identify a group of slots—within the inventory structure—depicted in the photographic image based a distribution of slots within the planogram contained within this field of view projection.

Alternatively, the computer system can: retrieve a stored geometry of slots in a known field of view of the fixed camera, such as stored in the planogram of the store or otherwise associated with the fixed camera; and identify a group of slots—within the inventory structure—depicted in the photographic image based on a projection of the stored geometry of slots onto the photographic image.

As described above, the computer system can then: extract a first constellation of features from a first region of the photographic image corresponding to a first slot in the first set of slots; retrieve a first product model representing a first set of visual characteristics of a first product type assigned to the first slot by the planogram; detect presence of a first product unit of the first product type occupying the first slot in the inventory structure at the first time in response to the first constellation of features approximating the first set of visual characteristics represented in the first product model; and repeat this process to detect and identify product types of other product units occupying the inventory structure and depicted in the photographic image.

9.3 Slot Definition+Slot Condition: Product Clusters

In yet another implementation, the computer system can: implement the foregoing methods and techniques to detect clusters of product units of the same product type in the image; and define slot boundaries of slots depicted in the image around clusters of product units of the same product type. The computer system can then execute the forgoing methods and techniques to derive a stock condition of each slot depicted in the image.

However, the computer system can implement any other method or technique to derive a stock condition of each slot depicted in the image.

9.4 Stock Flow

In one implementation, the computer system repeats the foregoing methods and techniques to process a sequence of images captured by the fixed camera over time and compiles stock conditions of individual slots—over a time period represented by the sequence of images—into "stock flows" of known product types from these slots, such as: fully-stocked rate or duration; understocked or fully-stocked rate or duration; out-of-stock rate or duration; product unit sale rate; and/or organization change over time for individual slots.

Therefore, the computer system can: derive a stock flow of a set of product types—assigned to a first set of slots in an inventory structure—between a first time and a second time based on: a first set of stock conditions in the set of slots derived from a first image of the inventory structure captured at the first time; and a second set of stock conditions in the set of slots derived from a second image of the inventory structure captured at the second time.

For example, the computer system can: select a first image captured at a first time succeeding a first scheduled restocking period in the store and depicting a first constellation of slots in a inventory structure in the store; select a second image captured at a second time preceding a second (i.e., next) scheduled restocking period in the store and depicting the same constellation of slots; and derive stock flows of a set of product types—assigned to slots depicted in the first and second images—between the first scheduled restocking period and the second scheduled restocking period based on differences in product unit count and position depicted in these images.

In a similar example, the computer system can automatically interpret recent and subsequent restocking of slots depicted in images captured by the fixed camera based on increases in quantities of product units in these slots between subsequent images. In particular, the computer system can: derive a first set of stock conditions from a first image captured by the fixed camera at a first time; detect a high frequency of understock and/or out-of-stock conditions in a set of slots depicted in the first image; derive a second set of stock conditions from a second image captured by the fixed camera at a second time succeeding the first time; detect a high frequency of understock and/or out-of-stock conditions in the set of slots depicted in the second image; and thus select the second image as depicting a first post-restocking state of the inventory structure. Later, the computer system can: derive a third set of stock conditions from a third image captured by the fixed camera at a third time succeeding the second time; detect a high frequency of understock and/or out-of-stock conditions in the set of slots depicted in the third image; derive a fourth set of stock conditions from a fourth image captured by the fixed camera at a fourth time succeeding the third time; detect a low frequency of understock and/or out-of-stock conditions in the set of slots depicted in the fourth image; and thus select the third image as depicting a second pre-restocking state of the inventory structure. Accordingly, the computer system can: derive a time duration between restocking of the inventory structure based on a time difference between the second image and the third image; and derive stock flows of product units of known product types from slots in the inventory structure based on a difference in stock conditions depicted in the second and third images.

10. Back-of-Store Inventory

As shown in FIG. 5, the computer system can implement similar methods and techniques to detect back-of-store inventory in the store based on images of back-of-store inventory structures in the store, such as by the mobile robotic system and/or fixed cameras.

For example, the computer system can: access an image, depicting a back-of-store inventory structure, captured by a fixed camera arranged within the back of the store; extract a set of features from the image; access a database of template visual features of loose product units of known product type and/or bulk packaging of known quantities of product units of these product types; and implement methods and techniques described above to derive a back-of-store inventory status of a particular product type in the store—at a time the image was captured—based on congruence between the set of features and stored template visual features of loose product units of the particular product type and/or bulk packaging of known quantities of product units of the particular product type.

Additionally or alternatively, the computer system can: access a delivery schedule of a first product type to the store; access a restocking schedule for the first slot; access sales data of the first product type at the store; and then derive (or "estimate") a back-of-store inventory status of the first product type—such as including a count of product units of the first product type—at the current time based on a) the delivery schedule of the first product type to the store, b) the restocking schedule for the first slot, and c) sales data of the first product type at the store.

However, the computer system can implement any other method or technique to derive or estimate a back-of-store inventory status of a product type and/or retrieve a back-of-store inventory status of a product type from any other database or data source.

11. Pattern Matching for Additional Product Facings

Block S130 recites—in response to a) detecting a first in-stock condition of a first product type at a first slot at a first time, b) detecting a first out-of-stock condition at the first slot at a later second time, and c) verifying presence of back-of-store inventory of the first product type proximal the second time—triggering an increase in quantity of product facings of the first product type at the first slot. Generally, in Block S130, the computer system can automatically increase or prompt manual increase of a quantity of product facings—and therefore a quantity of total product units—of a particular product type assigned to a slot: if this slot is correctly and frequently restocked; the slot is frequently out-of-stock thereafter while product units of the product type remain in back-of-store inventory in the store, as shown in FIG. 1.

More specifically, correct restocking of the slot during rescheduled stocking periods in the store followed by extended out-of-stock periods (e.g., more than four hours, one day) at the slot may indicate that demand for the product type at the slot is (significantly) greater than supply of the product type at the slot. Availability of the product type in back-of-store inventory while the product type is out-of-stock at the slot may indicate that the supply at the slot is limited by quantity product units at the slot after restocking (e.g., rather than back-of-store inventory or discontinuation of the product type). Furthermore, the computer system can automatically derive a restocking frequency at the slot based on increases in product unit quantity in the slot detected in images depicting the slot and/or extract a restocking frequency of the slot from a restocking schedule of the store.

Therefore, given a recurring pattern of in-stock and out-of-stock conditions at the slot, if the historical frequency of restocking at the slot approximates a target or maximum restocking frequency in the store, the computer system can trigger (e.g., automatically implement or prompt manual implementation of) an increase in product facing quantity of the product type at the slot. Conversely, if the historical frequency of restocking at the slot is less than the target or maximum restocking frequency in the store, the computer system can trigger an increase in frequency scheduled restocking events at the slot.

Furthermore, the computer system can identify all slots in the store assigned to this product type, such as based on slot assignments stored in the planogram or based on slot stock conditions derived from images captured by the mobile robotic system and/or fixed cameras in the store. Then, given a recurring pattern of in-stock and out-of-stock conditions at a particular slot, if the product type is assigned to multiple slots throughout the store, the computer system can trigger an increase in product facing quantity of the product type at the particular slot. Conversely, if the product type is assigned to a single slot in the store, the computer system can trigger creation of a second slot assigned to the product type and located in a different region of the store.

11.1 Stock Patterns

In one implementation shown in FIG. 1, the computer system stores stock patterns associated with various known slot conditions and corrective responses, such as: a first stock pattern associated with insufficient slot supply corrected by increasing slot product facings in the slot; a second stock pattern associated with insufficient slot supply corrected by increasing quantities of slots assigned to the same product type; a third stock pattern associated with insufficient slot supply corrected by increasing slot restocking frequency at the slot; a fourth stock pattern associated with a discontinued product type corrected by removing the slot; a fifth stock pattern associated with excess slot supply corrected by decreasing slot product facings in the slot; and a sixth stock pattern associated with insufficient back-of-store inventory corrected by increasing order quantity and/or order frequency of a corresponding product type; etc.

In one example, the computer system: accesses first image depicting a slot at a first time; derives a first in-stock condition of the slot at the first time based on features extracted from the first image; accesses second image depicting the slot at a second time succeeding the first time; derives a second out-of-stock condition of the slot at the second time based on features extracted from the second image; accesses third image depicting the slot at a third time succeeding the third time; and derives a third out-of-stock condition of the slot at the third time based on features extracted from the third image.

The computer system then: matches the first in-stock condition at the first slot at the first time, the second out-of-stock condition at the first slot at the second time, and the third out-of-stock condition at the first slot at the third time to a stored stock pattern associated with insufficient product facings, such as: the first stock pattern corrected by increasing slot product facings in the slot if multiple slots in the store are assigned to the product type and restocked at a target or maximum restocking frequency; the second stock pattern corrected by increasing quantities of slots assigned to the same product type if the slot is restocked at a target or maximum restocking frequency and few slots assigned to the product type are located in the store; or the third stock pattern corrected by increasing slot restocking frequency at the slot if the slot is restocked at less than the target or maximum restocking frequency. Based on the matched stock pattern, the computer system can: automatically update a planogram of the store; automatically update slot definitions stored on shelf tags; automatically update a restocking schedule; or serve a prompt to a store associate to manually update the planogram, slot definitions, and/or restocking schedule based on the correction defined in the matched stock pattern.

Furthermore, in this implementation, the computer system can: define a "slot fingerprint" based on stock conditions detected at the slot from between two consecutive restocking periods at the slot; calculate a confidence score for a match between the slot and a particular stock pattern based on (i.e., proportional to) a quantity of consecutive slot fingerprints that match the particular stock pattern. The computer system can then trigger action at the slot (e.g., increasing product facings at the slot) in response to the confidence score exceeding a threshold score.

In a similar implementation, the computer system can trigger an increase in a quantity of product facings of a particular product type at a first slot in response to detecting transition from an in-stock conditions to an out-of-stock condition at the slot at a time preceding a general scheduled restocking period in the store (or a scheduled restocking specific to the slot) by more than a threshold out-of-stock duration. More specifically, if the computer system detects transition into an out-of-stock condition at a slot more than a threshold duration (e.g., four hours, one day, two days) from scheduled or typical restocking at the slot, the computer system can trigger an increase in product facings allocated to the product type at the slot.

Additionally or alternatively, to account for maximum storewide or slot-specific restocking frequency in the store and while improving customer-product facing stock in the store, the computer system can trigger an increase in quantity of product facings of the product type at the slot further if a recent restocking frequency at the slot (e.g., for a past month) exceeding the maximum storewide or slot-specific restocking frequency. However, if the recent restocking frequency at the slot is less than the maximum storewide or slot-specific restocking frequency, the computer system can instead trigger an increase in restocking frequency of the product type at the slot.

However, the computer system can implement any other pattern (or "template") matching, parametric, or non-parametric techniques to predict a sale condition at a slot based on a sequence of past stock conditions at the slot.

11.2 Product Facing Delta

In one implementation, the computer system triggers a nominal increase in product facings of a product type in a slot, such as: one additional product facing; 30% more product facings; or 20% more product facings with a minimum increase of one additional product facing. The computer system can then repeat the foregoing process over time to add additional product facings to (or remove product facings from) the slot based on subsequent stock conditions at the slot and congruence between slot fingerprints of the slot and store stock patterns.

In another implementation, the computer system calculates a new target quantity of product facings that will reduce an out-of-stock time at the slot to less than a maximum out-of-stock time. In one example, the computer system calculates an increase in product facing quantity at the slot: proportional to a duration of time that the slot was out-of-stock following a last restocking period; proportional to an average or weighted duration of time that the slot was out-of-stock following multiple prior restocking periods; or proportional to ratio of out-of-stock to in-stock time following a last restocking period or multiple recent restocking periods. In another example, the computer system calculates an increase in product facing quantity at the slot: proportional to a confidence score that stock conditions at the slot match the first stock pattern associated with insufficient slot supply; and inversely proportional to confidence scores that stock conditions at the slot match other stored stock patterns.

11.3 Increased Product Facings: Automatic Planogram Update

Furthermore, the computer system can: access a planogram that contains assignments of target quantities of product facings in slots throughout the store for the current time; extract a current target quantity of product facings—of a product type at the slot at the current time—from the planogram; or interpret a current target quantity of product facings of the product type at the slot at the current time based on a count of product units of the first product type detected in the first region of the image; etc. Then, in response to matching a sequence of stock conditions at a slot to the first stock pattern, the computer system can replace the current target quantity of product facings in the planogram with a second, greater target quantity of product facings of the product type at the slot in Block S130.

11.4 Increased Product Facings: Prompt for Manual Planogram Update

Conversely, in response to matching a sequence of stock conditions at a slot to the first stock pattern, the computer system can: generate an electronic notification to increase product facings of the product type at the slot to a second, greater quantity; serve the electronic notification to an associate (e.g., a manager, an administrator) of the store; and update the planogram to assign the second quantity of product facings to the slot in response to receiving confirmation of the electronic notification from the associate.

11.5 Increased Product Facings: Direct to Restocking Schedule

Conversely, in response to matching a sequence of stock conditions at a slot to the first stock pattern, the computer system can: automatically update an electronic restocking schedule for the store to indicate a second, greater quantity of product facings of the product time at the slot; and transmit the electronic restocking schedule to an electronic device accessed by an associate of the store prior to and/or during a next scheduled restocking period in the store.

11.6 Additional Product Facings v. Additional Slots for Product Type

In another implementation, in response to matching a sequence of stock conditions detected at a slot to the second stock pattern, the computer system can trigger an insertion of an additional slot—assigned to the same product—in the store.

For example, the computer system can: access a first image, depicting a first inventory structure in the customer region of a store, captured at a first time; detect a first slot, in a first inventory structure, in a first region of the first image; extract a first set of features from the first region of the first image; detect a first set of product units of a product type occupying the first slot based on the first set of features; derive a first in-stock condition of the first slot at the first time based on the first set of product units; access a second image, depicting the first inventory structure, captured at a second time succeeding the first time; detect the first slot in a second region of the second image; extract a second set of features from the second region of the second image; derive a second out-of-stock condition of the first slot at the second time based on the second set of features; and access a back-of-store inventory status of the product type in the store proximal the second time. The computer system further queries the planogram of the store and/or a realogram of the store (e.g., derived from images recently captured by the mobile robotic system and/or fixed cameras) for a quantity of slots assigned to the product type. The computer system then matches the first slot to the second stock pattern in response to: detecting the first in-stock condition at the first slot at the first time; detecting the second out-of-stock condition at the first slot at the second time; presence of back-of-store inventory of the first product type proximal the second time according to the second back-of-store inventory status; and assignment of the product type to fewer than a threshold quantity of slots (e.g., a single slot) at the second time.

12. Product Facing Redistribution on Inventory Structure

In order to make room on an inventory structure for increased product facings of a first product type at a first shelf, the computer system can also: identify a second slot on the same shelf and/or in the same inventory structure at the first slot; and automatically reduce a quantity of product facings of the second product type allocated to the second slot. In particular, the computer system can identify a second slot—in the same inventory structure as the first slot—exhibiting shorter or no out-of-stock durations, associated with lower sales volume at the store, or that is assigned to a discontinued product type. The computer system can then reduce product facings assigned to the second slot or eliminate the second slot entirely and reallocate this shelf space in the inventory structure from the second slot to the first slot to accommodate additional product facings of the first product type in the first slot.

For example, the computer system can: detect a first slot, in a first inventory structure, in a first region of a first image captured at first time; extract a first set of features from a first region of the first image; and detect a first set of product units of a first product type occupying the first slot based on the first set of features; and derive a first in-stock condition of the first slot at the first time based on the first set of product units. The computer system can similarly: detect a second slot, in the first inventory structure, in a second region of the first image; extract a second set of features from the second region of the first image; detect a second set of product units of a second product type occupying the second slot based on the second set of features; and derive a second in-stock condition of the second slot at the first time based on the second set of product units. In this example, the computer system can then: detect the first slot in a third region of a second image captured at a second, later time; extract a third set of features from the third region of the second image; and derive a second out-of-stock condition of the first slot at the second time based on the third set of features. Conversely, the computer system can: detect the second slot in a fourth region of the second image; extract a fourth set of features from the fourth region of the second image; and derive a second in-stock condition of the second slot at the second time based on the fourth set of features. The computer system can then derive a sale rate of the second product type at the second slot based on a difference between the first in-stock condition of the second slot at the first time and the second in-stock condition of the second slot at the second time. The computer system can then implement methods and techniques described above to increase the quantity of product facings assigned to the first slot. Furthermore, in response to the sale rate of the second product type at the second slot falling below a threshold sale rate, the computer system can update a store planogram to reflect a reduced quantity of product facings at the second slot to accommodate more product facings at the first slot.

For example, the computer system can: extract a second current quantity of product facings of the second product type at the second slot at the second time from the planogram; derive the current quantity of product facings in the second slots from a quantity of product units of the second product type detected in an image captured immediately after a past restocking period; or by reading the current quantity of product facings of the second product type at the second slot from a corresponding shelf tag detected in an image of the inventory structure. Then, in response to the sale rate of the second product type at the second slot falling below a threshold sale rate, the computer system can: retrieve a first width of the first product type from a product database of from an image depicting the first product type on-shelf; retrieve a second width of the second product type from a product database of from an image depicting the second product type on-shelf; calculate a quantity of product facings of the second product type that span a total width approximating a total width of the additional product facings of the first product type based on the first width and the second width; and decrement the current quantity of product facings of the second product type at the second slot by this quantity of product facings of the second product necessary to accommodate the added product facings of the first product type at the first slot on the inventory structure.

12.1 Pattern Matching for Discontinued Product

In one variation, the computer system predicts that a product type is discontinued based a sequence of stock conditions detected at a slot assigned to the product type—such as by matching these stock conditions to the fourth stock pattern described above.

For example, the computer system can: access a first image, depicting a first inventory structure in the customer region of the store, captured at a first time; detect a first slot, in the first inventory structure, in a first region of the first image; extract a first set of features from the first region of the first image; derive a first out-of-stock condition of the first slot at the first time based on the first set of features; access a second image, depicting the first inventory structure, captured at a second, later time; detect the first slot in a second region of the second image; extract a second set of features from the second region of the second image; derive a second out-of-stock condition of the first slot at the second time based on the second set of features; access a third image, depicting the first inventory structure, captured at a third time succeeding the second time; detect the first slot in a third region of the third image; extract a third set of features from the third region of the third image; and derive a third out-of-stock condition of the first slot at the third time based on the third set of features. The computer system can then predict discontinuation of the first product type (i.e., that the first product was discontinued) in response to: detecting the first out-of-stock condition at first slot at the first time; detecting the second out-of-stock condition at first slot at the second time; and detecting the third out-of-stock condition at first slot at the first time.

Therefore, the computer system can predict that the first product type was discontinued in response to matching these stock conditions of the first slot to the fourth stock pattern described above. Then, in response to predicting discontinuation of the first product type, the computer system can trigger reassignment of the first slot on the first inventory structure to a second product type, such as: a replacement of the first product type supplied by the same manufacturer as the first product type; or an alternative product type competitive with the first product type.

Alternatively, in response to predicting discontinuation of the first product type, the computer system can: remove the first slot from the planogram; identify a second slot on same inventory structure that best matches the first stock pattern, and reallocate shelf space from the first slot to additional product facings of a second to assigned to the second slot.

13. Pattern Matching for Expanded Product Type Order

In another variation, the computer system identifies and automatically addresses out-of-stock conditions at a slot due to insufficient back-of-store inventory structure, such as in response to identifying a sequence of stock conditions at a slot that match the fifth stock pattern described above.

For example, the computer system can: implement methods and techniques described above to automatically increase a quantity of product facings of a first product type assigned to a first slot based on a first sequence of stock conditions detected at the first slot over a first time period; track a second sequence of stock conditions at the first slot and back-of-store inventory of the first product type over a second time period; match the second sequence of stock conditions to the sixth stock condition pattern to predict insufficient back-of-store inventory of the first product type; and then automatically modify a delivery order to specify a greater quantity of product units of the first product type accordingly. Therefore, the computer system can trigger an increase in delivery quantity of product units of the first product type for future scheduled product delivery to the store in response to: detecting an understock condition at the first slot at during the second time period; and detecting absence of back-of-store inventory of the first product type during the second time period.

The computer system can implement similar methods and techniques and techniques to automatically update deliver orders to reflect higher order quantities for other product types assigned to other slots in the store based on slot and back-of-store inventory conditions for these product types.

The computer system can also automatically update deliver orders to reflect lower order quantities for a product type assigned to a slot in the store based on slot: absence of out-of-stock conditions at the slot and excess back-of-store inventory for the corresponding product type; and/or in response to decreasing a quantity of facings of the product type assigned to the slot, as described above.

14. Variation: Stock Condition Data

Figure 6:
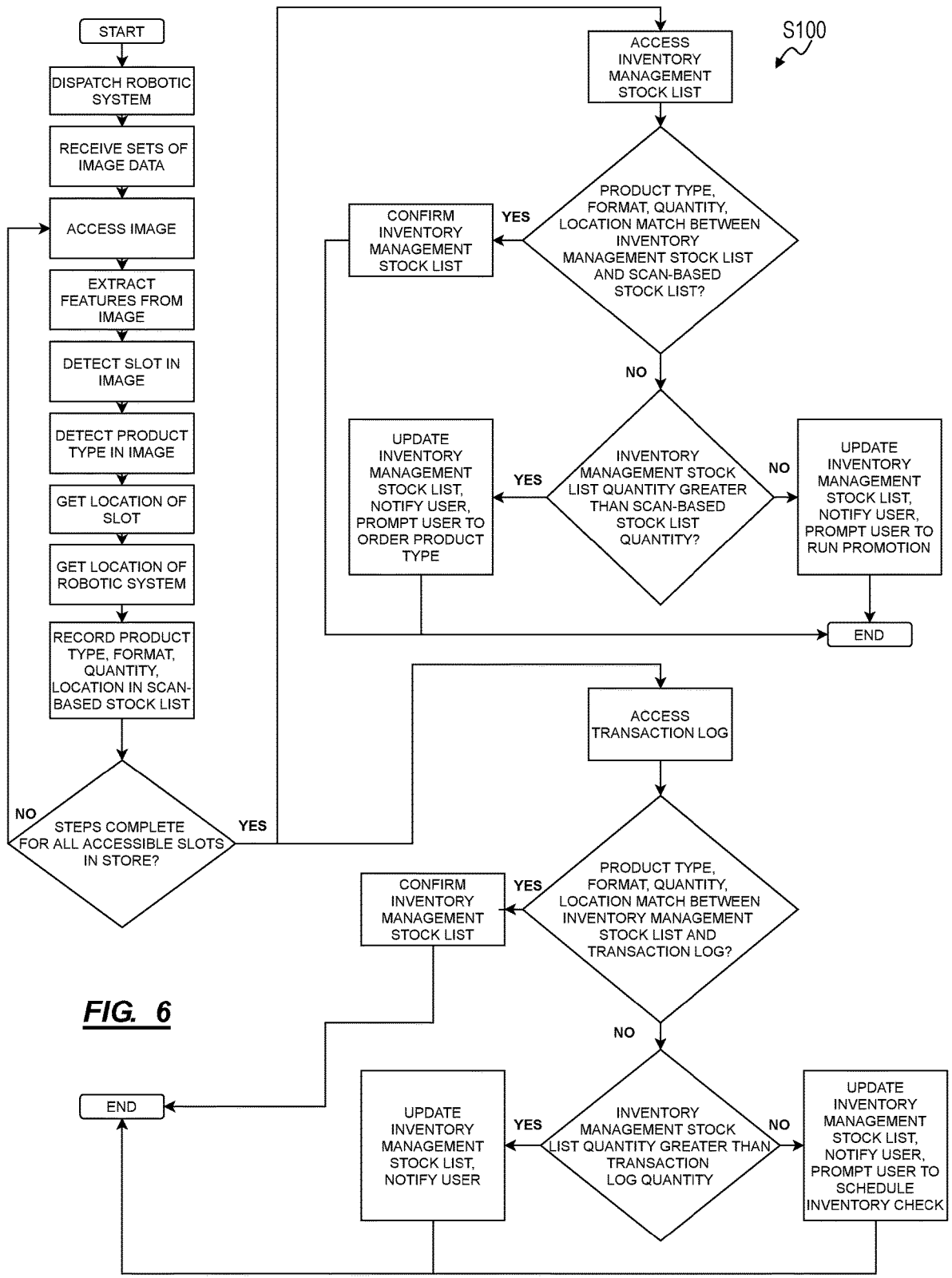
FIG. 6 is a flowchart representation of one variation of the method.

In one variation shown in FIG. 6, the method S100 includes: deploying a mobile robotic system in a store; dispatching the mobile robotic system to autonomously navigate through the store and record images depicting inventory structures located within the store; accessing a first image recorded by the mobile robotic system; detecting a first slot in an inventory structure depicted in a first image in the set of images; identifying a first product unit in the first slot as a first product type based on a set of features extracted from the first image, the first product type assigned to the first slot; identifying a location of the first product unit based on the location of the mobile robotic system at the time the image is recorded, the first slot identified in the image, or both; recording data corresponding to the first product type in a scan-based stock list; accessing an inventory management system, specifically an inventory management stock list including data corresponding to the first product type; identifying a difference between the data of the scan-based stock list corresponding to the first product type and the data of the inventory management stock list corresponding to the first product type; and updating the inventory management stock list to match the scan-based stock list; notifying a user, via a user portal, of the difference between the inventory management stock list and the scan-based stock list.

Additionally, the method S100 can include: accessing a point-of-sale system, specifically a transaction log including data corresponding to the first product type; identifying a difference between the data of the scan-based stock list corresponding to the first product type and the data of the transaction log corresponding to the first product type;

notifying a user, via a user portal, of the difference between the transaction log and the scan-based stock list.

Additionally the method can include: identifying a difference between the data of the inventory management stock list corresponding to the first product type and the data of the transaction log corresponding to the first product type; updating the inventory management stock list to match the scan-based stock list; notifying a user, via a user portal, of the difference between the transaction log and the scan-based stock list.

14.1 Applications

Generally, A computer system dispatches a mobile robotic system deployed within a store to autonomously navigate through the store and record images depicting inventory structures located in the store, including front-of-store shelves, bins and product displays, top-shelf inventory structures configured to maintain local inventory, and back-of-store inventory structures. The mobile robotic system uploads the reordered images of the inventory structures within the store. The computer system can analyze images recorded by the mobile robotic system to identify features depicted in the image corresponding to: product type; product format; product location; product orientation; product quantity; inventory structures; and slots;

The computer system records the elements extracted from the image during analysis into a scan-based stock list that indicates a first location and a first quantity of a first product type recorded by the mobile robotic system at the time of recording. The computer system then repeats these steps for the remaining slots, locations, or product types present in the store to complete the scan-based stock list.

The computer system can access an inventory management system of the store, in particular an inventory management stock list that depicts a second location and second quantity of the first product type. The computer system can then identify a difference between the first quantity and the second quantity, or the first location and the second location, and perform an action in response, such as notifying a user, via a user portal, of the difference, or automatically updating the inventory management system to change the second quantity of the first product to match the first quantity of the first product.

The computer system can access a point-of-sale system, in particular a transaction log which depicts a third quantity of the first product type, corresponding to a number of units sold. The computer system can then identify a difference between the first quantity and the third quantity, and perform an action in response, such as notifying a user, via a user portal, of the difference.

In one variation, the mobile robotic system is unable to scan the entire area of the store. The computer system can access previous scan-based stock lists to predict location, quantity, product format, or other characteristics of a product type in the unscanned region of the store. Alternatively, the computer system can access an image captured by a fixed camera depicting a slot containing the first product type in the region of the store unscanned by the mobile robotic system.

In another variation, the computer system can serve the user with a prompt to dispatch the mobile robotic system to record an image of the location and serve the image to the user. In another variation, the computer system can serve the user with a prompt to access a live image or live video feed of the location recorded in real time by a fixed camera.

14.2 Stock Detection and Product Stock Count

The computer system can therefore derive stock conditions of product stocked and stored throughout the store based on features extracted from images captured by the mobile robotic system and/or the set of fixed camera, such as including product format (e.g., loose, boxed), product type, and location (e.g., slot address of nearest slot) of each product unit detected in images—of inventory structures throughout the store—captured during a scan cycle.

The computer system can further compile these stock conditions into a stock list representing the last detected position of each product unit within the store during the last scan cycle. The computer system can additionally or alternatively compile these stock conditions into a map or list of locations (e.g., slots addresses) containing each product type—and their product unit quantities and formats—stocked in the store. For example, the computer system can update a realogram of the store to reflect storewide stock conditions derived from images captured during the preceding scan cycle.

14.3 Data Integration

The computer system can access an inventory management stock list within an inventory management system (IMS) deployed in the store to retrieve product data including: product type, product format, product dimensions, product stock count, location, units on hand, units ordered, etc. The computer system can also access a planogram of the store and compare a planogram stock list to the scan-based stock list to identify discrepancies.

For example, the inventory management system can generate and maintain an inventory management stock list of product types stocked in the store and automatically update the stock in response to: receipt of a stock delivery; a sale recorded by a point-of-sale system deployed in the store; or loss of stock (such as spoilage or damage to a product unit). In particular, for a first product type, the computer system can access the inventory management system to query the inventory management stock list to retrieve inventory data of each product format of the first product type available in the store and the location or locations (i.e., slot assignment, inventory slot assignment) in which the product type is placed within the store. The computer system can compare the product data for a first product type from the inventory-based stock list to the scan-based stock list from the most recent scan to identify incongruencies regarding the first product type between the two data sources; or validate the units of the first product type recorded in the inventory-based stock list recorded by the inventory management system by identifying congruent results between the two systems.

The computer system can access a transaction log from a point-of-sale (POS) or point-of-purchase (POP) system deployed in the store to retrieve product data including: units sold (by product format), time of sale, units returned, time of return, etc.

For example, the point-of-sale system can generate and maintain a transaction log of units sold by product type and product format, and in response to a sale of a product unit, automatically update the inventory management system to modify the stock count of the product type sold in the inventory management stock list. In particular, the computer system can access the point-of-sale system to query the transaction log to retrieve product data for a first product type including: product format and number of units sold; time of sale; product format and number of units returned; and time of return. The computer system can compare the product data for a first product type from the transaction log to the scan-based stock list from the most recent scan to identify incongruencies regarding the first product type between the two data sources; or validate the units of the first product type sold as recorded in the transaction log by the point-of-sale system by identifying congruent results between the two systems.

14.4 Notifications

The computer system can serve notifications to a user (e.g., a store manager, a store associate)—via a user portal—in response to: completion of a scan of the store; detecting a product type in a location other than locations assigned to the product type by the planogram and/or shelf tags; or detecting other incongruent conditions in slots throughout the store.

For example, for a first product type, the computer system can: access the inventory management stock list to retrieve a first quantity of a first product type; access the scan-based stock list to retrieve a second quantity of the first product type; and serve a notification to a user including the first product type, the product format of the first product type, the location where the first product type is assigned, the first product quantity, the second product quantity, and the location of the second quantity of the first product type. In one variation, the computer system can access the transaction log of the point-of-sale system to retrieve a third quantity of the first product type in addition to the inventory management stock list and the scan-based stock list.

The computer system can compare product data including quantity, time, and location, between the computer system, inventory management system, and point-of-sale system to derive the state of inventory in the store, update the inventory management system, and serve notifications to store staff regarding any incongruencies between the systems.

14.4.1 Congruent Results

In one variation, the first quantity of the first product type (retrieved from the inventory management stock list) and the second quantity of the first product type (retrieved from the scan-base stock list) are within a threshold difference (e.g., 5%; 5 product units) of one another. In response, the computer system confirms the accuracy of the inventory management stock list and confirms that units of the first product type are not likely present in regions of the store not scanned during the last scan cycle. The computer system transmits a notification to a staff member confirming the accuracy of the inventory management stock list and including the scan data from the last completed scan.

14.4.2 Incongruent Results: Phantom Inventory

In one variation, the first quantity (retrieved from the inventory management stock list) exceeds the second quantity (retrieved from the scan-based stock list) by more than a first threshold difference. In response, the computer system can: predict that the inventory management stock list is inaccurate and indicates more units of the first product type in the store than are present; and prompt the user to update the quantity of the first product type indicated in the inventory management stock list to the quantity indicated in the scan-based stock list.

However, if the first quantity exceeds the second quantity by more than a second, greater threshold difference, then the computer system can prompt the user to manually verify stock of the first product type, dispatch the mobile robotic system to repeat the entire scan cycle, or dispatch the mobile robotic system to scan the areas of the store not scanned in the previous scan.

In another variation, the computer system can update the scan-based stock list to reflect quantities of the first product type detected in the unscanned region of the store during past or historical scan cycles.

In one implementation, the computer system can: query a planogram of the store for a set of slots—assigned the first product type—in unscanned regions of the store. If the planogram indicates a slot located in the unscanned region is assigned the first product type, the computer system can: access scan data corresponding to a previous scan to retrieve the last stock condition of the slot or time of last confirmed restock of the slot, the stock condition including the total quantity of units of the first product type detected in the store during a last scan cycle or confirmed during last restock; access the transaction register to retrieve a sale quantity of the first product type since the last scan cycle or last restock; estimate a current total quantity of first product type at the current time based on last total quantity less the sale quantity of units of the first product type; and predict the quantity of the first product type at the unscanned slot based on the estimated current total quantity of first product type and the quantity of the first product type detected in images recorded by the mobile robotic system during the current scan cycle. Then, if the predicted quantity of the first product type at the unscanned slot is greater than the maximum quantity of product units of the first product type that the unscanned slot can contain, or is greater than the average historical quantity of product units of the first product type on the unscanned slot, the computer system can determine that the inventory management stock list is likely inaccurate, and the inventory management system is predicting more units of the first product type in store than are (likely) present.

However, if the predicted quantity of the first product type at the unscanned slot is less than or equal to the maximum quantity of product units of the first product type that the unscanned slot can contain, or approximates the average historical quantity of product units of the first product type on the unscanned slot, then the inventory management stock list is (likely) accurate. In this implementation, the computer system can also prompt or schedule manual inventory of the unscanned slot to confirm quantity at unscanned slot.

Conversely, in this implementation, if the computer system's query of the planogram returns no slot assigned to the first product type in an unscanned region, then the computer system can: retrieve a set of historical scan-based stock lists for the store compiled from previous store scans; query the set of historical scan-based stock lists for a set of past locations of units of the product type detected in any previous scan of the presently unscanned region of the store; derive an average quantity of units of the first product type detected in the unscanned region of the store based on the set of historical scan-based stock lists; and sum the quantity of units of the first product type detected during the current scan cycle, and the average quantity of units of the first product type detected in the unscanned region of the store in the set of historical scan-based stock lists, to estimate the total quantity of units of the first product type currently in the store. If the total quantity of units of the first product type currently in the store is less than the quantity of the first product type indicated by the inventory management stock list, then the inventory management stock list is likely inaccurate, and the inventory management system is predicting more units of the first product type than are present in the store.

The computer system's query returning no slot which is assigned the first product type in the unscanned region is more likely to occur in a back-of-store inventory scenario. However, the situation could occur in a front-of-store inventory scenario in the event a patron (or other individual) removes a product unit from the shelf (presumably, but not necessarily from the product unit's assigned slot) and places the product unit in a location other than the location from which the patron previously retrieved the product unit.

In another variation, the computer system can: access the point-of-sale system to query the transaction record for a sale of a product type within a time duration; receive a response from the POS system indicating no transactions of the product type occurring within the time duration; and subsequently access the inventory management system to query the inventory management stock list for a quantity of the product type present within the store. If the inventory management stock list returns a non-zero quantity of the product type, then the inventory management stock list is likely inaccurate, and the inventory management system is predicting more units of the first product type than are present in the store, and the computer system dispatches the mobile robotic system to scan inventory structures for the product type.

The computer system can execute the above steps for all other product types in the store.

14.4.3 Incongruent Results: Found Inventory

In another variation wherein the second quantity of the first product (retrieved from the scan-based stock list) exceeds the first quantity (retrieved from the inventory management stock list) by more than a first threshold difference, the computer system can: predict that the inventory management stock list is inaccurate and the inventory management system is predicting fewer units of the first product type in the store than are truly present and prompt the user to update the quantity of the first product type indicated in the inventory management stock list to the quantity indicated in the scan-based stock list.

However, if the second quantity of the first product exceeds the first quantity by more than a second, greater threshold difference, the computer system can prompt the user to: manually verify stock of the first product type; or dispatch the mobile robotic system to perform an additional scan of the store. Additionally, the computer system can: access an order management system; query the set of orders due to arrive at the store within a time duration (e.g., the next day, within the next week) for a third quantity of the first product type; if a third quantity exceeds a quantity threshold and the order is scheduled to arrive at the store within the time duration, prompt the user to cancel the order.

In another variation, the computer system can: access the scan-based stock list to retrieve location data corresponding to the second quantity of the first product type; access a planogram of the store and/or an inventory map of the inventory structures to retrieve an expected location, or set of expected locations, of the first product type; determine that the location of the second quantity of the first product type does not match any expected location of the first product type; generate and serve a notification to a user indicating the second quantity of the first product type and the location of the second quantity of the first product type.

In another variation wherein the second quantity exceeds the first quantity by more than a second, greater threshold difference, the computer system can: query an order management system for orders of the first product type arriving at the store within a threshold time duration; and identify an order indicating a third quantity of the first product type arriving at the store within the threshold time duration. In response to detecting an order, the computer system can prompt a user to: cancel the order; postpone the order to a future time; or start a promotion for the first product type.

The computer system can execute the above steps for all other product types in the store.

14.4.4 Interpolating Scan Data Between Scan Cycles

The computer system can access the inventory management system and/or point-of-sale system to retrieve data to supplement analysis of the scan data received by the computer system from the mobile robotic system or fixed-camera system.

For example, the mobile robotic system completes a first scan of the store at a first time and the computer system compiles a first scan-based stock list from the scan data of the first scan received from the mobile robotic system indicating a first product type is out-of-stock. The mobile robotic system then completes a second, subsequent scan of the store at a second time and the computer system compiles a second scan-based stock list from the scan data of the second scan received from the mobile robotic system indicating a first product type is out-of-stock. In response to detecting an out-of-stock event for the first product type in more than one scan-based stock list within a time duration greater than the time difference between the first and second times, the computer system can: access the inventory management system; query the inventory management system for restocking events corresponding to the first product type in the store that have occurred after the first time and before the second time; and, if the inventory management system returns a restocking event occurring after the first time but before the second time, corresponding to the first product type, record two separate out-of-stock events. However, if the inventory management system does not return any restocking events occurring after the first time but before the second time and corresponding to the first product type, the computer system records one out-of-stock event.

The computer system can execute the above steps for all other product types in the store.

14.5 Variation: Sale with Zero Inventory

In one variation, the computer system receives a notification from a point-of sale system indicating a sale of a first sale quantity of the first product type. In response, the computer system can: access an inventory management system to retrieve a stock count of the first product type from an inventory management stock list; determine that the stock count of the first product type from the inventory management stock list is less than the first sale quantity of the first product type; dispatch the mobile robotic system to rescan the store, scanning first any assigned locations of the first product type and scanning second any locations of the store not scanned in the previous scan cycle; and prompt the user to update the inventory management stock list to reflect the scan results or to perform a manual inventory check of the assigned location of the first product type and/or locations of the store not scanned in the previous scan cycle.

14.5.1 Variation: Supplier Notifications

In one variation, wherein the first quantity (retrieved from the inventory management stock list) exceeds the second quantity (retrieved from the scan-based stock list) by more than a first threshold difference, the computer system generates a prompt to a user to submit an order of the first product type to the supplier of the first product type.

In another variation, wherein the second quantity exceeds the first quantity by more than a first threshold difference, the computer system can: query an order management system for orders of the first product type arriving at the store within a threshold time duration; identify an order indicating a third quantity of the first product type arriving at the store within the threshold time duration; and, in response to detecting an order, generate a prompt to the supplier of the order to cancel the order, delay the order until a future time, or prompt the user with a suggestion of another product type to add the order.

14.5.2 Variation: Other Stakeholders

In one variation, in which a third party has ordered from the store an ordered quantity of the first product type, the computer system can: access a scan-based stock list and retrieve a scanned quantity of the first product type; determine that the ordered quantity exceeds the scanned quantity of the first product type; notify the third party that the store is unable to fulfil the order placed by the third party; access the scan-based stock list and retrieve a quantity of a second product type; determine that the quantity of the second product type exceeds the ordered quantity of the first product type; and recommend the second product type to the third party as a substitute for the first product type.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
by a mobile robotic system:
autonomously navigating throughout a customer region of a store during a scan cycle; and
via an optical sensor integrated into the mobile robotic system, capturing images of inventory structures in the customer region of the store during the scan cycle; and
by a computer system:
accessing a first image, depicting a first inventory structure in the customer region of the store, captured by the mobile robotic system at a first time during the scan cycle;
detecting a first slot, in the first inventory structure, in a first region of the first image;
extracting a first set of features from the first region of the first image;
detecting a first set of product units of a first product type occupying the first slot at the first time based on the first set of features, the first product type assigned to the first slot;
deriving a first in-stock condition of the first slot at the first time based on the first set of product units;
accessing a second image, depicting the first inventory structure, captured by the mobile robotic system at a second time succeeding the first time;
detecting the first slot in a second region of the second image;
extracting a second set of features from the second region of the second image; and
deriving a first out-of-stock condition of the first slot at the second time based on the second set of features;
accessing a first back-of-store inventory status of the first product type in the store proximal the second time; and
triggering an increase in quantity of product facings of the first product type at the first slot in response to:
detecting the first in-stock condition at the first slot at the first time;
detecting the first out-of-stock condition at the first slot at the second time; and
presence of back-of-store inventory of the first product type proximal the second time according to the first back-of-store inventory status.

2. The method of claim 1, wherein triggering the increase in quantity of product facings of the first product type at the first slot comprises:
accessing a planogram of the store, the planogram assigning target quantities of product facings in slots in the store at the second time;
extracting a first target quantity of product facings of the first product type at the first slot at the second time from the planogram; and
replacing the first target quantity in the planogram with a second quantity of product facings of the first product type at the first slot, the second quantity greater than the first quantity.

3. The method of claim 2, further comprising:
detecting a second slot, in the first inventory structure, in a third region of the first image;
extracting a third set of features from the third region of the first image;
detecting a second set of product units of a second product type occupying the second slot based on the third set of features, the second product type assigned to the second slot;

deriving a second in-stock condition of the second slot at the first time based on the second set of product units;
detecting the second slot in a fourth region of the second image;
extracting a fourth set of features from the fourth region of the second image; and
deriving a third in-stock condition of the second slot at the second time based on the fourth set of features;
deriving a sale rate of the second product type at the second slot based on a difference between the second in-stock condition and the third in-stock condition; and
in response to the sale rate of the second product type at the second slot falling below a threshold sale rate:
   extracting a third target quantity of product facings of the second product type at the second slot at the second time from the planogram;
   replacing the third target quantity in the planogram with a fourth quantity of product facings of the second product type at the second slot to accommodate the second quantity of product facings of the first product type at the first slot, the fourth quantity less than the third quantity.

4. The method of claim 1:
further comprising interpreting a first target quantity of product facings of the first product type at the first slot at the second time based on a count of product units of the first product type detected in the first region of the image; and
wherein triggering the increase in the quantity of product facings of the first product type at the first slot comprises:
   updating an electronic restocking schedule for the store to indicate a second quantity of product facings of the first product time at the first slot, the second quantity greater than the first quantity; and
   transmitting the electronic restocking schedule to an electronic device accessed by an associate of the store prior to a scheduled restocking period in the store.

5. The method of claim 1, wherein triggering the increase in the quantity of product facings of the first product type at the first slot comprises:
accessing a planogram of the store, the planogram assigning target quantities of product facings in slots in the store at the second time;
extracting a first target quantity of product facings of the first product type at the first slot at the second time from the planogram;
generating an electronic notification to increase product facings of the first product type at the first slot to a second quantity greater than the first quantity;
serving the electronic notification to an associate of the store; and
in response to receiving confirmation from the associate, updating the planogram to assign the second quantity of product facings to the first slot.

6. The method of claim 1, wherein triggering the increase in the quantity of product facings of the first product type at the first slot comprises triggering the increase in the quantity of product facings of the first product type at the first slot in response to detecting the first out-of-stock condition at the first slot at the second time preceding a scheduled restocking period in the store by more than a threshold out-of-stock duration.

7. The method of claim 1:
further comprising accessing a first restocking frequency of the first slot between the first time and the second time;
wherein triggering the increase in quantity of product facings of the first product type at the first slot comprises triggering the increase in quantity of product facings of the first product type at the first slot further in response to:
   the first restocking frequency approximating a maximum restocking frequency set for slots in the store;
further comprising:
   accessing a third image, depicting a second inventory structure in the customer region of a store, captured at the first time;
   detecting a second slot, in the second inventory structure, in a third region of the third image;
   extracting a third set of features from the third region of the third image;
   detecting a second set of product units of a second product type occupying the second slot based on the third set of features, the second product type assigned to the second slot;
   deriving a second in-stock condition of the second slot at the first time based on the second set of product units;
   accessing a fourth image, depicting the second inventory structure, captured at the second time;
   detecting the second slot in a fourth region of the fourth image;
   extracting a fourth set of features from the fourth region of the fourth image; and
   deriving a second out-of-stock condition of the second slot at the second time based on the fourth set of features;
   accessing a second back-of-store inventory status of the second product type in the store proximal the second time;
   accessing a second restocking frequency of the second slot between the first time and the second time; and
   triggering an increase in restocking frequency of the second product type at the second slot in response to:
      detecting the second in-stock condition at the second slot at the first time;
      detecting the second out-of-stock condition at the second slot at the second time;
      presence of back-of-store inventory of the second product type proximal the second time according to the second back-of-store inventory status; and
      the second restocking frequency falling below the maximum restocking frequency set for slots in the store.

8. The method of claim 1:
wherein accessing the first back-of-store inventory status of the first product type in the store proximal the second time comprises:
   accessing a third image, depicting a back-of-store inventory structure proximal the second time, captured by a first fixed camera arranged within the store;
   extracting a third set of features from the third image; and
   deriving the back-of-store inventory status of the first product type in the store proximal the second time based on the third set of features.

9. The method of claim 1:
wherein detecting the first slot in the first region of the first image comprises:
  detecting a first shelf tag in the first image; and
  locating a first slot boundary on the first image relative to the first shelf tag; and
further comprising:
  reading a first product identifier from the first shelf tag depicted in the first image; and
  retrieving a set of template visual features, associated with the first product identifier, from a template product feature database;
wherein extracting the first set of features from the first region of the first image comprises:
  detecting a first object in the first region of first image bounded by the first slot boundary; and
  extracting the first set of features, representing the first object, from the first region of the first image;
wherein detecting the first set of product units of the first product type occupying the first slot comprises identifying the first object as a first product unit, in the first set of product units, of the first product type based on congruence of the first set of features and the first set of template visual features; and
wherein deriving the first in-stock condition of the first slot at the first time comprises deriving the first in-stock condition based on a count of product units in the first set of product units.

10. The method of claim 1:
wherein accessing the first image comprises:
  accessing a first sequence of photographic images captured by the optical sensor in the mobile robotic system during the scan cycle while traversing an aisle in the store product facing the first inventory structure; and
  compiling the first sequence of photographic images into the first image defining a first composite photographic image depicting a first set of shelving segments spanning the first inventory structure.

11. The method of claim 10:
further comprising deploying the mobile robotic system to autonomously navigate throughout the customer region of the store and the back-of-store inventory region of the store during a second scan cycle;
wherein accessing the second image comprises:
  accessing a second sequence of photographic images captured by the mobile robotic system during the second scan cycle while traversing the aisle; and
  compiling the second sequence of photographic images into the second image;
wherein accessing the first back-of-store inventory status of the first product type in the store proximal the second time comprises:
  accessing a third image, depicting a back-of-store inventory structure, located in the back-of-store inventory region, captured by the mobile robotic system during the second scan cycle;
  extracting a third set of features from the third image; and
  deriving the first back-of-store inventory status of the first product type in the store proximal the second time based on the third set of features.

12. The method of claim 1, wherein accessing the first back-of-store inventory status of the first product type in the store proximal the second time comprises:
accessing a delivery schedule of the first product type to the store;
accessing a restocking schedule for the first slot;
accessing sales data of the first product type at the store; and
deriving the first back-of-store inventory status of the first product type, comprising a count of product units of the first product type, proximal the second time based on:
  the delivery schedule of the first product type to the store;
  the restocking schedule for the first slot;
  sales data of the first product type at the store.

13. The method of claim 1, further comprising:
accessing a third image, depicting the first inventory structure, captured at a third time succeeding the second time;
detecting the first slot in a third region of the third image;
extracting a third set of features from the third region of the third image;
detecting a third set of product units of the first product type occupying the first slot at the third time based on the third set of features;
deriving a first understock condition of the first slot at the third time based on the third set of product units;
accessing a second back-of-store inventory status of the first product type in the store proximal the third time; and
triggering an increase in delivery quantity of product units of the first product type during scheduled product deliveries to the store in response to:
  detecting the first understock condition at the first slot at the third time;
  absence of back-of-store inventory of the first product type proximal the third time according to the second back-of-store inventory status.

14. The method of claim 1, further comprising:
accessing a third image, depicting a second inventory structure in the customer region of the store, captured at the first time;
detecting a second slot, in the second inventory structure, in a third region of the third image;
extracting a third set of features from the third region of the third image;
deriving a second out-of-stock condition of the second slot at the first time based on the third set of features;
accessing a fourth image, depicting the second inventory structure, captured at the second time;
detecting the second slot in a fourth region of the fourth image;
extracting a fourth set of features from the fourth region of the fourth image;
deriving a third out-of-stock condition of the second slot at the second time based on the fourth set of features;
accessing a fifth image, depicting the second inventory structure, captured at a third time succeeding the second time;
detecting the second slot in a fifth region of the fifth image;
extracting a fifth set of features from the fifth region of the fifth image;
deriving a fourth out-of-stock condition of the second slot at the third time based on the fifth set of features;
predicting discontinuation of the second product type in response to:
  detecting the second out-of-stock condition at the second slot at the first time;
  detecting the third out-of-stock condition at the second slot at the second time; and detecting the fourth out-of-stock condition at the second slot at the third time; and
in response to predicting discontinuation of the second product type, triggering reassignment of the second slot on the second inventory structure to a third product type.

15. The method of claim 1:
further comprising:
   detecting a second slot, in the first inventory structure, in a third region of the first image;
   extracting a third set of features from the third region of the first image;
   deriving a second out-of-stock condition of the second slot at the first time based on the third set of features;
   detecting the second slot in a fourth region of the second image;
   extracting a fourth set of features from the fourth region of the second image;
   deriving a third out-of-stock condition of the second slot at the second time based on the fourth set of features;
   predicting discontinuation of the second product type in response to:
      detecting the second out-of-stock condition at the second slot at the first time;
      detecting the third out-of-stock condition at the second slot at the second time; and
   wherein triggering the increase in quantity of product facings of the first product type at the first slot comprises triggering reallocation of shelf space on the first inventory structure from product facings of the second product type at the second slot to additional product facings of the first product type at the first slot further in response to predicting discontinuation of the second product type.

16. The method of claim 1:
further comprising:
   accessing a third image, depicting the first inventory structure, captured at an intermediate time between the first time and the second time;
   detecting the first slot in a third region of the third image;
   extracting a third set of features from the third region of the third image; and
   deriving an intermediate out-of-stock condition of the first slot at the intermediate time based on the third set of features; and
wherein triggering the increase in quantity of product facings of the first product type at the first slot comprises:
   matching the first in-stock condition at the first slot at the first time, the intermediate out-of-stock condition at the first slot at the intermediate time, and the first out-of-stock condition at the first slot at the second time to a stored stock pattern associated with insufficient product facings; and
   triggering the increase in quantity of product facings of the first product type at the first slot based on the stored stock pattern.

17. The method of claim 1:
wherein triggering the increase in quantity of product facings of the first product type at the first slot comprises triggering the increase in quantity of product facings of the first product type at the first slot further based on presence of multiple slots, arranged throughout the store, assigned to the first product type; and further comprising:
   accessing a third image, depicting a second inventory structure in the customer region of a store, captured at the first time;
   detecting a second slot, in a second inventory structure, in a third region of the third image;
   extracting a third set of features from the third region of the third image;
   detecting a second set of product units of a second product type occupying the second slot based on the third set of features, the second product type assigned to the second slot;
   deriving a second in-stock condition of the second slot at the first time based on the second set of product units;
   accessing a fourth image, depicting the second inventory structure, captured at a fourth time succeeding the third time;
   detecting the second slot in a fourth region of the fourth image;
   extracting a fourth set of features from the fourth region of the fourth image;
   deriving a second out-of-stock condition of the second slot at the fourth time based on the fourth set of features;
   accessing a second back-of-store inventory status of the second product type in the store proximal the fourth time; and
   triggering insertion of a third slot, assigned to the second product type, to a third inventory structure in the customer region of the store in response to:
      detecting the second in-stock condition at the second slot at the third time;
      detecting the second out-of-stock condition at the second slot at the fourth time;
      presence of back-of-store inventory of the first product type proximal the second time according to the second back-of-store inventory status; and
      assignment of the second product type to the second slot exclusive of other slots in the store at the fourth time.

18. A method comprising:
by a mobile robotic system:
   autonomously navigating throughout a customer region of a store during a first scan cycle; and
   via an optical sensor integrated into the mobile robotic system, capturing images of inventory structures in the customer region of the store during the first scan cycle; and
by a computer system:
   accessing a first image, depicting a first inventory structure in a customer region of a store, captured at a first time, during the first scan cycle, by the mobile robotic system;
   detecting a first slot, in the first inventory structure, in a first region of the first image;
   extracting a first set of features from the first region of the first image;
   detecting a first set of product units of a first product type occupying the first slot at the first time based on the first set of features, the first product type assigned to the first slot;
   deriving a first in-stock condition of the first slot at the first time based on the first set of product units;
   accessing a second image, depicting the first inventory structure, captured by the mobile robotic system at a second time succeeding the first time;

detecting the first slot in a second region of the second image;
extracting a second set of features from the second region of the second image;
deriving a first out-of-stock condition of the first slot at the second time based on the second set of features;
accessing a third image, depicting the first inventory structure, captured at a third time succeeding the second time;
detecting the first slot in a third region of the third image;
extracting a third set of features from the third region of the third image;
deriving a second out-of-stock condition of the first slot at the third time based on the third set of features;
matching the first in-stock condition at the first slot at the first time, the first out-of-stock condition at the first slot at the second time, and the second out-of-stock condition at the first slot at the third time to a stored stock pattern associated with insufficient product facings; and
triggering increase in quantity of product facings of the first product type at the first slot based on the stored stock pattern.

19. The method of claim 18:
further comprising deploying the mobile robotic system to autonomously navigate throughout the customer region of the store during the first scan cycle; and
wherein accessing the first image comprises:
accessing a first sequence of photographic images captured by the optical sensor in the robotic system during the first scan cycle while traversing an aisle in the store product facing the first inventory structure; and
compiling the first sequence of photographic images into the first image defining a first composite photographic image depicting a first set of shelving segments spanning the first inventory structure.

20. The method of claim 1, further comprising by the computer system:
accessing a third image, depicting a second inventory structure in the customer region of the store, captured by a first fixed sensor installed in the store at a third time;
detecting a second slot, in the second inventory structure, in a third region of the third image;
extracting a third set of features from the third region of the third image;
detecting a second set of product units of a second product type occupying the second slot at the third time based on the third set of features, the second product type assigned to the second slot;
deriving a second in-stock condition of the second slot at the third time based on the second set of product units.

* * * * *